United States Patent [19]
Kirk et al.

[11] Patent Number: 5,859,153
[45] Date of Patent: *Jan. 12, 1999

[54] NOVOLAK COMPOUNDS USEFUL AS ADHESION PROMOTERS FOR EPOXY RESINS

[75] Inventors: Alan R. Kirk, Cottage Grove; Allen L. Griggs, St. Paul, both of Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 668,176

[22] Filed: Jun. 21, 1996

[51] Int. Cl.$^6$ ............................ C08G 8/12; C08L 63/00; C08L 63/02
[52] U.S. Cl. .................... 525/481; 525/480; 525/484; 525/486; 525/523; 525/533; 528/141; 528/144; 528/153; 528/154; 528/155
[58] Field of Search .................. 525/480, 481, 525/484, 486, 523, 533; 528/141, 144, 153, 154, 155

[56] References Cited

U.S. PATENT DOCUMENTS

| | | | |
|---|---|---|---|
| 3,304,276 | 2/1967 | Faulkner | 260/22 |
| 4,200,712 | 4/1980 | Cohen | 526/62 |
| 4,340,716 | 7/1982 | Hata | 528/100 |
| 4,530,947 | 7/1985 | Kojo | 523/450 |
| 4,560,732 | 12/1985 | Kojo | 525/481 |
| 5,013,791 | 5/1991 | Kerr | 525/113 |
| 5,034,478 | 7/1991 | Shimizu et al. | 526/62 |
| 5,128,230 | 7/1992 | Templeton et al. | 430/191 |
| 5,178,986 | 1/1993 | Zampini et al. | 430/190 |

FOREIGN PATENT DOCUMENTS

| | | |
|---|---|---|
| 0 342 035 | 11/1989 | European Pat. Off. . |
| WO 91/03448 A | 3/1991 | WIPO . |
| WO 94/14867 A | 7/1994 | WIPO . |
| WO 95/08584 A | 3/1995 | WIPO . |

OTHER PUBLICATIONS

S. Yariv et al., "Organometallic–Clay Complexes. Part V. Fe(III)–Pyrocatechol", *Israel J. Chem.* 2(5), pp. 201–208, Dec. 1964.

I.P. Mavani et al., "Study of Some Ternary Complexes in Solution", *J. Indian Chem. Soc.* 49(5), pp. 469–474, 1972.

R. Griesser et al., "Mixed Ligand Complexes with Co, Ni, Cu, or Zn Ions", *Inorg. Chem.* 10(10), pp. 2229–2232), 1971.

J. Zelinka et al., "Potentiometrische Untersuchung der Bildung von Komplexen des Vanadyls mit o–Diphenolen und o–Phenolcarbonsäuren", *Collect. Czech. Chem. Commun.*, 3667, pp. 2614–2624, 1971.

G.F. Condike et al., "Mixed Ligand Chelates of Copper(III)", *J. Inorg. Nucl. Chem.*, 31(8), pp. 2455–2466, 1969.

H. Sigel et al., "Ternary Complexes in Solution. XV. Mixed Ligand Complexes with 2,2'–Bipryridyl or 1,10–Phenanthroline and Pyrocatecholate or Derivatives Thereof", *Inorg. Chem.*, 12(5), pp. 1198–1200, 1973.

M.A. Kessick, "Phenolic Resins Capable of Boron Complexation", *J. Polym. Sci.*, Part B, 10(7), pp. 527–530, 1972.

*Primary Examiner*—Robert E. Sellers
*Attorney, Agent, or Firm*—Janice D. Dowdall; Daniel C. Schulte

[57] ABSTRACT

A composition useful as a powder coating comprises an epoxy resin and a novolak compound or resin having a structure obtained from the reaction of a substituted phenol such as cresol and an aldehyde to form a substituted bis (hydroxymethyl) phenol intermediate which is then reacted with a polyhydroxyphenol containing adjacent hydroxyl groups such as catechol to yield a polyhydroxyphenol-endcapped novolak compound or resin.

7 Claims, No Drawings

NOVOLAK COMPOUNDS USEFUL AS ADHESION PROMOTERS FOR EPOXY RESINS

FIELD OF THE INVENTION

The present invention relates to novel novolak compounds which are particularly useful as adhesion promoting curing agents in compositions which comprise epoxy resins and the compositions themselves.

BACKGROUND OF THE INVENTION

Certain novolak resins are known to those skilled in the art. These novolaks are conventionally prepared by condensing phenol and formaldehyde in the presence of an acid catalyst. Typically these known novolak resins are prepared with less than one mole of formaldehyde per mole of phenol. Generally, the most common starting materials are phenol and aqueous formaldehyde. These starting materials are selected because of their good reactivity, availability and low cost. The acid catalyst is either an inorganic type such as sulfuric acid, hydrochloric acid, phosphoric acid, or other types known in the art. The acid may also be an organic acid such as p-toluenesulfonic acid, methanesulfonic acid or oxalic acid. Certain catalysts are chosen for their reactivity or their influence on the properties, such as color.

These known novolak resins, upon heating, do not harden to an insoluble or infusible condition but remain organic solvent soluble and fusible. They can be hardened or cured by the addition of a curing agent, such as hexamethylenetetramine or trioxane, and further heating.

In a typical procedure to prepare a conventional novolak, the phenol and catalyst are intimately mixed. The formaldehyde is added either by initially mixing with the phenol and catalyst, portionwise, or continuously over a defined time. Because of practical considerations, the formaldehyde is usually added portionwise or continuously. The reaction generates heat, so cooling is often required. Once the initial exotherm is completed, the mixture is heated to complete the reaction of the two components. The novolak resin usually separates from the water layer and can be isolated at this point. Alternatively, the reaction mixture can be dehydrated under heat and vacuum to isolate the novolak resin. The novolak resin is a solid at room temperature.

The conditions of a typical procedure produce a novolak with various chain lengths, and the reaction of the formaldehyde with the phenol is usually random. This produces a novolak with varied substitution of the phenol ring. Depending on the reaction conditions and the type of phenol used, the molecular weight and softening temperature of the final resin may vary. Typically, the number average molecular weight, as determined by size exclusion chromatography, ranges from 300 to 2000 or higher.

Generally, the source of aldehyde used to prepare these known novolak resins is aqueous formaldehyde. Paraformaldehyde, trioxane and hexamethylenetetramine have also been used for this purpose.

Various phenols have been used to prepare these known novolaks. Such phenols include cresols, xylenols, biphenols, catechols, hydroquinones, naphthols and the like, including mixtures of the same. Certain phenols are chosen to impart specific properties, such as varying the softening temperature, water solubility or insolubility, color and melt viscosity.

Certain phenols used to prepare these known novolaks contain two or more adjacent hydroxyl groups. Such phenols include pyrogallol, catechol, tannic acid, gallic acid and the like. The phenols which have adjacent or vicinal hydroxyl groups, are known to be metal chelators. Metals such as iron, copper, manganese, vanadium, and others form complexes with these types of phenols (See: S. Yariv, W. Bodenheimer, and L. Heller, *Israel J. Chem.* 1964, 2(5), pp. 201–8; I. P. Mavani, C. R. Jejurkar, and P. K. Bhattacharya, *J. Indian Chem. Soc.* 1972, 49(5), pp. 469–74; R. Griesser and H. Sigel, *Inorg. Chem.* 1971, 10(10), pp. 2229–32; J. Zelinka and M. Bartusek, *Collect. Czech Chem. Commun.* 1971, 36(7), pp. 2628–37; G. F. Condike and A. E. Martell, *J. Inorg. Nucl. Chem.* 1969, 31(8), pp. 2455–66; H. Sigel, P. R. Huber, R. Griesser, and B. Prijs, *Inorg. Chem.* 1973, 12(5), pp. 1198–200; and M. A. Kessick, *J. Polym. Sci., Part B,* 1972, 10(7), pp. 527–30).

Uses of known novolak resins include coatings, adhesives, fiber bonding abrasives, laminates, foundry resins, friction materials, molding materials and wood composites. Certain known novolaks have been used as adhesion promoters for epoxy resins.

U.S. Pat. No. 3,304,276 (Faulkner and O'Neill) describes the preparation and use of metal-reactive polyhydric phenol-modified short oil and long oil alkyds that cure even at room temperature to form rust inhibiting, essentially non-blistering, durable finishes on unoxidized iron and steel surfaces. The polyhydric phenols include tannins, methyl gallate, propyl gallate, catechol and pyrogallol. These authors found that Fe/polyhydric phenolic chelate complexes are formed with the clean ferrous surface.

U.S. Pat. No. 4,340,716 (Hata et al.) and Japanese J5 6,149,716 teach that good coating compositions showing good adherence and good anticorrosive properties can be prepared by combining (A) a prepolymer of epoxy resin and polyhydroxyphenolic compound with (B) an organic hardener for epoxy resins. The prepolymer (A) is prepared by prereacting small amounts of polynuclear adjacent aromatic hydroxyl-containing compounds, including catechol and pyrogallol novolaks with epoxies. The reaction ratio of the epoxy resin and the polyhydric phenolic compound is 1.0/0.05 to 1.0/0.1 (mole/mole).

U.S. Pat. Nos. 4,560,732 and 4,530,947 (Kojo et al.) teach a laquer-type coating composition for metals that forms chelate bonds with the metal to provide strong adhesion to the metal. This solvated coating composition comprises the reaction product of epoxy resins and polynuclear polyhydroxyphenols, including catechol and pyrogallol novolaks. These reaction products have $M_n$ values of 12,000 to 31,000 and are prepared at ratios insuring that unreacted adjacent aromatic hydroxyls are available. These coatings are applied as lacquers and are unsuitable for making powder coatings because the dried out resins will not melt flow adequately.

SUMMARY OF THE INVENTION

We have identified that a need exists for novel compounds which can be used, for example, to enhance the adhesion of epoxy resins to metal substrates under solvent free conditions (e.g. powder coatings).

We have discovered certain novel novolak compound(s). These novel novolak compound(s) can be used, for example to enhance the adhesion of epoxy resin to metal substrates under typical powder coating conditions.

One aspect of the invention relates to a novel compound (s) of the formula:

Formula I

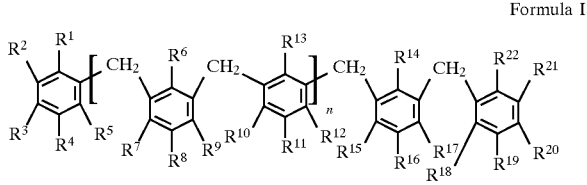

wherein:

$R^1$, $R^2$, $R^3$, $R^4$, and $R^5$ are each independently selected from the group consisting of —OH, —SH, —H, $C_{1-20}$alkyl, —F, —Cl, —Br, —I, alkoxy, aryl, alkaryl, and alkenyl groups;

$R^1$, $R^2$, $R^3$, $R^4$, and $R^5$ are selected such that at least two vicinal groups selected from the group consisting of —OH, —SH, and combinations thereof are present on a ring structure to which $R^1$, $R^2$, $R^3$, $R^4$, and $R^5$ are attached;

one of the groups selected from the group consisting of $R^6$, $R^7$, and $R^9$ are —OH or —SH and the remainder of the groups selected from the group consisting of $R^6$, $R^7$, and $R^9$ are selected independently from the group consisting of —H, $C_{1-20}$ alkyl, —F, —Cl, —Br, —I, alkoxy, aryl, alkaryl, and alkenyl groups;

$R^8$ is selected from the group consisting of $C_{1-20}$alkyl, —H, —F, —Cl, —Br, —I, alkoxy, aryl, alkaryl, and alkenyl groups;

$R^{11}$ is selected from the group consisting of —OH and —SH;

$R^{10}$ and $R^{12}$ are each independently selected from the group consisting of —OH, —SH, —H, $C_{1-20}$alkyl, —F, —Cl, —Br, —I, alkoxy, aryl, alkaryl, and alkenyl groups; wherein at least one of $R^{10}$ and $R^{12}$ is —OH or —SH;

$R^{13}$ is selected from the group consisting of —H, $C_{1-20}$alkyl, —OH, —SH, —F, —Cl, —Br, —I, alkoxyl, aryl, alkaryl, and alkenyl groups;

one of the groups selected from $R^{14}$, $R^{15}$, and $R^{17}$ are —OH or —SH and the remainder of the groups selected from the group consisting of $R^{14}$, $R^{15}$, and $R^{17}$ are independently selected from the group consisting of —H, $C_{1-20}$alkyl —F, —Cl, —Br, —I, alkoxy, aryl, alkaryl, and alkenyl groups;

$R^{16}$ is selected from the group consisting of $C_{1-20}$alkyl, —H, —F, —Cl, —Br, —I, alkoxy, aryl, alkaryl, and alkenyl groups;

$R^{18}$, $R^{19}$, $R^{20}$, $R^{21}$, and $R^{22}$ are each independently selected from the group consisting of —OH, —SH, —H, $C_{1-20}$alkyl, —F, —Cl, —Br, —I alkoxy, aryl, alkaryl, and alkenyl groups;

$R^{18}$, $R^{19}$, $R^{20}$, $R^{21}$, and $R^{22}$ are selected such that at least two vicinal groups selected from the group consisting of —OH, —SH, and combinations thereof are present on a ring structure to which $R^{18}$, $R^{19}$, $R^{20}$, $R^{21}$, and $R^{22}$ are attached; and n is an integer of zero or greater.

Preferably the structure of the compound of Formula —I is such that $R^2$, $R^3$, $R^{20}$, and $R^{21}$ are each independently selected from the group consisting of —OH and —SH;

$R^1$, $R^4$, $R^5$, $R^{18}$, $R^{19}$, and $R^{22}$ are each independently selected from the group consisting of —H and $C_{1-20}$alkyl groups;

$R^6$ and $R^{14}$ are each independently selected from the group consisting of —OH and —SH;

$R^8$ and $R^{16}$ are each independently selected from the group consisting of $C_{1-20}$alkyl, —H, —F, —Cl, —Br, and —I;

$R^7$, $R^9$, $R^{15}$, and $R^{17}$ each represent —H;

$R^{11}$ is selected from the group consisting of —OH and —SH;

$R^{10}$ and $R^{12}$ are independently selected from the group consisting of —H, —SH, —H, $C_{1-20}$alkyl, —F, —Cl, —Br, —I, alkoxy, aryl, alkaryl, and alkenyl groups; wherein at least one of $R^{10}$ and $R^{12}$ is —OH or —SH;

$R^{13}$ is selected from the group consisting of $C_{1-20}$alkyl, —H, —F, —Cl, —Br, —I, alkoxy, aryl, alkaryl, and alkenyl groups.

Most preferably the structure of the compound of Formula I is such that $R^2$, $R^3$, $R^6$, $R^{10}$, $R^{11}$, $R^{14}$, $R^{19}$, and $R^{20}$ each represent —OH;

$R^1$, $R^4$, $R^5$, $R^7$, $R^9$, $R^{12}$, $R^{13}$, $R^{15}$, $R^{17}$, $R^{18}$, $R^{21}$, and $R^{22}$ each represent —H; and $R^8$ and $R^{16}$ each represent —$CH_3$.

Preferably the structure of the compound of Formula I is such that n is an integer of 0 to 10 for reasons of improved processability and reduced viscosity. Most preferably the structure of the compound is such that n is an integer of 0 to 2 for reasons of improved solubility in various epoxy compositions.

The novolaks of the invention are endcapped with polyhydroxyphenols (e.g., catechol) containing adjacent hydroxyl groups. When two different phenols are used in the same reaction mixture, the more reactive phenol generally reacts with the formaldehyde first. This gives a disproportionate amount of one phenolic novolak over the other. For example, in the case of reacting catechol and cresol, the catechol will react preferentially with the formaldehyde since catechol is much more reactive than the alkyl substituted phenol. By mixing the two phenols together, especially with a 2:1 ratio of catechol to cresol, the reaction of cresol will be "starved" of formaldehyde. This will produce large blocks of catechol/formaldehyde novolak. Producing a catechol/cresol novolak which is endcapped with catechol would not be possible using a conventional novolak preparation. (See Reaction Scheme 1 below.)

Reaction Scheme 1

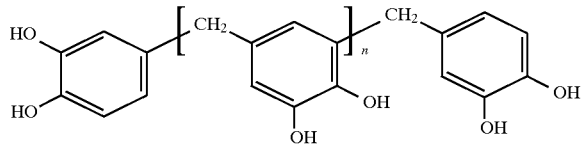

where n = 0, 1, 2, . . . (plus much unreacted cresol)

-continued
Reaction Scheme 1

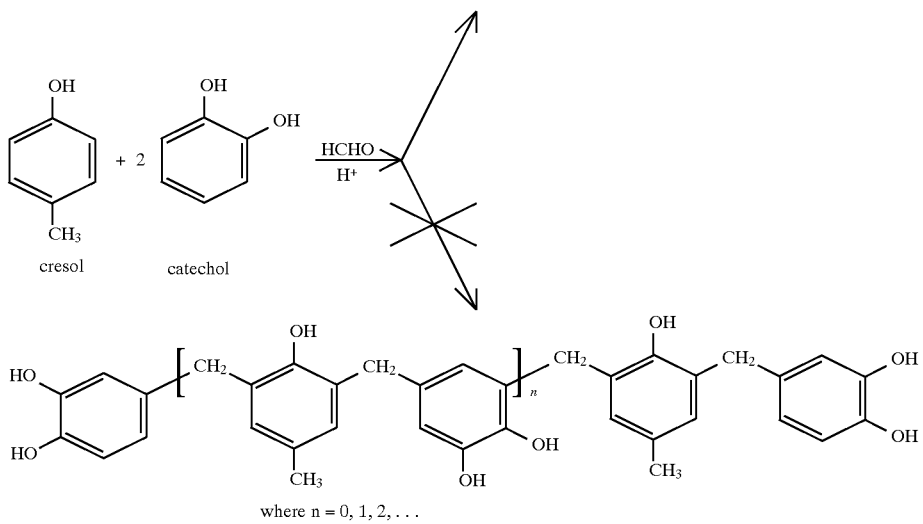

where n = 0, 1, 2, . . .

Although the reaction of catechol and formaldehyde will provide a novolak which is endcapped with catechol, it is our experience that the novolak produced is water soluble and extremely hydrophilic. In powder coatings, this can cause several problems in formulating. Blocking can occur and free flowing powders are not produced. Additionally, undesirable voids are formed in the cured coating.

We have discovered that incorporating substituted phenols within the novolak structure can substantially reduce or eliminate water sensitivity or water solubility. As an additional advantage, the novolak resin becomes more soluble in nonaqueous systems such as epoxy powder coating formulations. Further, residual polyhydroxyphenol monomers can be removed by simple water washing.

The method of making the preferred novel compound(s) of the invention is a two step reaction whereby in the first step, a substituted phenol, (p-cresol, for example) is reacted with an aldehyde (formaldehyde, for example) under basic conditions to form a substituted dimethylolphenol intermediate (also referred to as a bis(hydroxymethyl) phenol intermediate). In the second step, the substituted dimethylolphenol is reacted with a polyhydroxyphenol containing adjacent hydroxyl groups (catechol, for example) under acidic conditions to produce the polyhydroxyphenol (catechol) endcapped novolak compound(s) of the invention. This two step reaction precludes the preferential reaction of formaldehyde with the polyhydroxyphenol (catechol). (See Reaction Scheme 2 below.)

Reaction Scheme 2

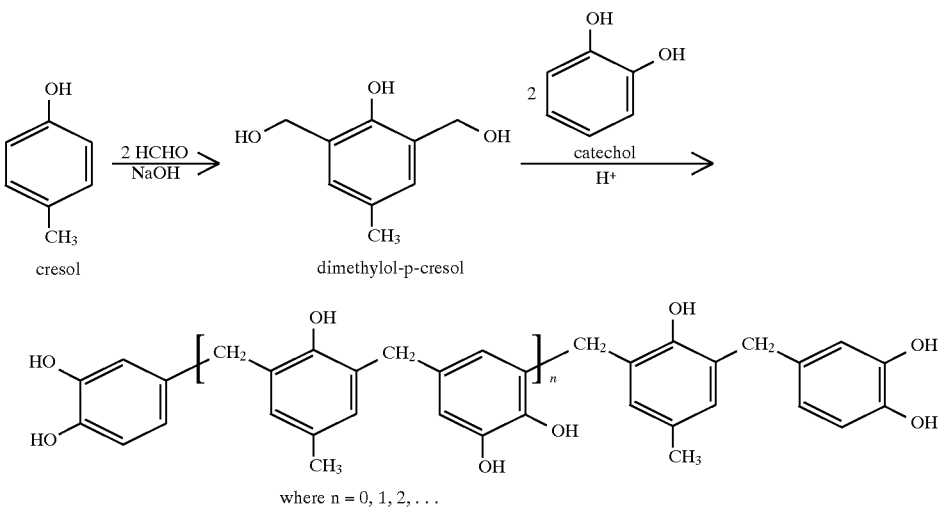

where n = 0, 1, 2, . . .

Another aspect of the invention relates to the use of the compound(s) of the invention as adhesion promoting curing agent(s) in a second composition comprising an epoxy resin. The novel curable composition comprises:

(a) an epoxy resin;
(b) the compound(s) of the present invention;
(c) a catalyst;
(d) optionally a hygroscopic solvent; and (e) optionally a curing agent different than that of element (b).

A preferred novel curable powder coating composition of the invention comprises:

(a) about 45 to about 98.45 percent by weight of a solid epoxy resin having a glass transition temperature greater than about 40° C.;

(b) about 0.3 to about 10 percent by weight of the novel compound of the invention;

(c) about 0.2 to about 20 percent by weight of a catalyst; and (d) about 1 to about 30 percent by weight of a solid curing agent different than that of element (b);

(e) about 0.05 to about 1.5 percent by weight of a flow control agent;

(f) 0 to about 55 percent by weight of a filler; and (g) 0 to about 10 percent by weight of a colorant;

wherein said weight percentages are based upon the total weight of (a), plus (b), plus (c), plus (d), plus (e), plus (f), plus (g).

Definition of Terms

The term "adhesion promoter" as used herein refers to a compound which when added to a curable polymer composition will provide enhanced bond strength and durability of that polymer composition when applied to and cured on a metal substrate, particularly when exposed to hot and wet conditions for an extended time.

The term "curing agent" as used herein refers to compound(s) having reactive groups which are capable of reacting with epoxy resins under conditions suitable for said reaction and in suitable stoichiometric amounts to from a solid infusible cured matrix.

DETAILED DESCRIPTION OF THE INVENTION

I. Compound(s) of the Invention

With respect to Formula I, examples of suitable alkoxy groups include but are not limited to those selected from the group consisting of methoxy, butoxy, propoxy, ethoxy, biphenyloxy, and phenoxy groups. Examples of suitable aryl group include but are not limited to those selected from the group consisting of phenyl, biphenyl, naphthyl, pyridyl, furyl, pyrryl, thienyl, quinonyl, imidazoyl, oxazoyl, and thiazoyl groups. Examples of suitable alkaryl groups include but are not limited to those selected from the group consisting of phenethyl, benzyl, cumyl, isopropenyl, and phenylisopropenyl groups. Examples of suitable alkenyl groups include but are not limited to those selected from the group consisting of allyl, cinnamyl, methallyl, vinyl, and styryl groups.

Generally a typical reaction to make the polyhydroxyphenol endcapped novolak of the invention (compound of Formula I) comprises the following steps:

(a) reacting a substituted phenol with an aldehyde in a 1:2 molar ratio under basic conditions to form a dimethylolphenol intermediate;

(b) intimately mixing and reacting, in the presence of an acid catalyst, approximately two molar equivalents of a polyhydroxyphenol (e.g. catechol or other adjacent hydroxyl aromatic), either in water or neat, with one molar equivalent of the substituted dimethylolphenol intermediate of step (a). catalyst; and (c) isolating the polyhydroxyphenol (e.g. catechol) endcapped novolak of the present invention directly by extracting with a solvent or dehydrating to dryness and removing from the reaction vessel.

Typically 0.5 to 20 molar percent of acid catalyst are used per mole of the substituted bis(hydroxymethyl)phenol. The temperature of reaction is usually between about 50 and about 100 degrees C. and more preferably is near the reflux temperature of the reaction mixture. The length of time of reaction can be varied depending on the type of properties desired, but typically is several hours at the reflux temperature. Solvents which can be used to isolate the compound of the invention include, for example, ethyl acetate, tetrahydrofuran, methylene chloride, ether, trichloroethane, or dichloroethane. Typically for practical handling reasons, the novolak is heated to a molten state and drained to a suitable container.

Substituted Phenols

Generally, a range of properties is obtained when using different substituted phenols in making compounds of the invention. Suitable substituents include alkyl, alkoxy, aryl, halogen, and other substituents which would not interfere with the reaction. For example, phenols substituted with small alkyl groups ($C_1$ to $C_9$) tend to have lower softening points than halo substituted phenols. Phenols substituted with larger alkyl groups ($C_{10}$ to $C_{20}$) tend to have glass transition temperatures (Tg) and softening points lower than phenols substituted with smaller alkyl groups. The wide variations of substituent groups are used to find the optimum properties of the final novolak.

Examples of suitable substituted phenols include but are not limited to those selected from the group consisting of cresols, (tert)butylphenol, methoxyphenol, phenylphenol, benzylphenol, phenethylphenol, ethylphenol, isopropylphenol chlorophenol, bromophenol, fluorophenol, mixtures thereof and the like.

Polyhydroxyphenols

Examples of suitable polyhydroxyphenols useful in making the compound of Formula I include but are not limited to those selected from the group consisting of catechol and substituted catechols. Examples of suitable substituents include alkyl alkoxy, aryl, halogen, and other substituents which would not interfere with the reaction. Specific examples include methylcatechols, (tert)butylcatechols, ethylcatechols, isopropylcatechols, butylcatechols, (tert)butylcatechols, amylcatechols, (tert)amylcatechols, benzylcatechols, phenethylcatechols, phenylcatechols, fluorocatechols, chlorocatechols, bromocatechols, methoxycatechols, ethoxycatechols, formylcatechols, allylcatechols, ortho-dihydroxynaphthalenes.

Aldehydes

Examples of suitable sources of aldehyde useful in making the compound of Formula I include but are not limited to those selected from the group consisting of aldehydes such as formaldehyde, paraformaldehyde, trioxane, acetaldehyde, glyoxal, butyraldehyde, propionaldehyde, benzaldehyde, furfural, phenylacetaldehyde, chloral, chloroacetaldehyde, dichloroacetaldehyde, mixtures thereof and the like.

Acid Catalysts

Examples of suitable acid catalysts useful in making the compound(s) of the invention include but are not limited to those selected from the group consisting of acids such as sulfuric, hydrochloric, phosphoric, methanesulfonic, trifluoromethanesulfonic, trifluoroacetic, formic, oxalic, benzenesulfonic, p-toluenesulfonic, mixtures thereof and the like. The acid catalyst concentration is typically in a range of about 0.5 to about 20 molar percent of the substituted bis(hydroxymethyl)phenol.

II. Uses of the Compound of the Invention

The compound(s) of the invention can be used, for example, in coatings, composites, molding compounds, foundry resin compositions and additives to epoxies. A preferred use of the compound(s) of the invention are as adhesion promoting curing agents for coating compositions comprising solid epoxy resins.

Epoxy Resins

Epoxy resins useful in compositions of the invention are well-known in the literature. Especially preferred are the polyglycidyl ethers of bisphenol A. These are available in various epoxy equivalent weights ranging from 170 up to about 2500. Those versions having epoxy equivalent weights above about 500 are solids at room temperature. Polyglycidyl ethers of various polyhydroxybenzenes, e.g., resorcinol, catechol, etc., biphenols, or various other bisphenols such as for example bisphenol F or bisphenol S, are equally suitable. Another class of epoxy resins are the epoxidized novolaks such as ECN 1235 from Ciba Geigy or DEN 438 from Dow Chemical. Still other suitable epoxy resins are glydicylated bisanilines such as MY 720 from Ciba Geigy, glydicylated p-aminophenol such as MY 0510 from Ciba Geigy, aliphatic polyepoxides such as Araldite™ RD-2 from Ciba Geigy, DER 732 from Dow Chemical, Epon 871, and Heloxy 84 from Shell Chemical, and cyclohexene oxide polyepoxides such as ERL 4221 from Union Carbide. Still other suitable epoxy resins include polyglycidyl ethers of various hydantoins such as XU 238 from Ciba Geigy, triglycidyl isocyanurate, various polyglycidyl ethers of polysecondary alcohols, for example, Ciba Geigy PY 322, various polyglycidyl esters such as Araldite™ CY 184 from Ciba Geigy, and various epoxidized vegetable oils. Halogenated polyepoxy resins are also suitable.

An additional comprehensive description of typical epoxy resins can be found in U.S. Pat. No. 5,013,791 (assigned to PPG Industries), incorporated by reference herein. Epoxy resins are also thoroughly described in the monograph *Handbook of Epoxy Resins*, H. Lee and K. Neville, McGraw-Hill, New York, 1967 and in *Epoxy Resin Technology*, P. F. Bruins, ed., Interscience Publishers, New York, 1968, both incorporated by reference herein.

Catalysts

The catalyst used in the composition of the invention should be capable of accelerating the reaction of epoxy groups with epoxy reactive groups. The epoxy groups are present in the epoxy resin. The epoxy reactive groups are present in the compound(s) of the invention and other curing agents. The epoxy reactive groups include phenolic groups, which are present in the compound(s) of the invention, as well as other groups including anhydrides, primary and secondary amines, thiols, mixtures thereof and the like. The catalyst also facilitates epoxy/epoxy homopolymerization. Catalysts, unlike curing agents, are not consumed during the reaction.

Examples of suitable catalysts include but are not limited to those selected from the groups consisting of 2-methylimidazole and adducts thereof 2,4,6-tris (dimethylaminomethyl)phenol, N,N-dimethylbenzylamine, stannous octoate, chromium octoate, cobalt octoate, titanium octoate, zirconium octoate, mixtures thereof and the like.

Preferably the catalyst is solid for reasons of improved storage stability of the curing composition.

Curing Agents

Curing agents are compounds comprising multiple epoxy reactive groups. These epoxy reactive groups can react with the epoxy groups of an epoxy resin to form a solid infusible matrix. This reaction is typically accelerated by a catalyst.

The compound(s) of the invention is a curing agent in that it contains phenolic groups which are epoxy reactive and is consumed during an epoxy polymerization. Typically other curing agents are used in addition to the compound(s) of the invention in order to achieve the desired properties of the cured epoxy matrix.

Examples of suitable curing agents other than the compounds of the present invention include but are not limited to those selected from the group consisting of primary aliphatic and aromatic amines (such as butylamine, ethylenediamine, aniline, benzylamine, hexamethylenediamine, methylenedianiline, diaminodiphenylsulfone, etc.), secondary aliphatic and aromatic polyamines (such as piperazine, etc.), thiols (such as thiol terminated polyoxyalkylene compounds), anhydrides (such as benzophenonetetracarboxylic acid, dianhydride, trimelitic anhydride, etc.), and oxazolines (such as phenylenebisoxazoline, etc.) and mixtures thereof.

For preparing epoxy powder coating compositions, the curing agents are solid. Examples of preferred solid curing agents for epoxy powder coating compositions are those selected from the group consisting of solid bisphenolic terminated epoxy resin, solid bisphenols, and dicyandiamide. Preferably the curing agent is present in an amount from about 1 to about 30 percent by weight based on the total weight of the epoxy resin, compound(s) of the invention, catalyst, and curing agent.

Hygroscopic Solvents

The curable composition of the invention optionally further comprises a hygroscopic solvent for applications other than powder coatings. The hygroscopic solvent serves to remove any water present from the surface of an intended metal substrate. Alternatively and/or in addition, the metal substrate can be heated to about 150° C. or greater, preferably about 180° C. or greater to remove surface water. Examples of suitable hygroscopic solvents include but are not limited to those selected from the group consisting of acetone, methylethyl ketone, tetrahydrofuran, ethylacetate, $C_1$ to $C_4$ alcohols, mixtures thereof and the like.

The curable composition of the invention can optionally further comprise a flow control agent. Examples of suitable flow control agents include but are not limited to those selected from the group consisting of low molecular weight polyacrylate polymers such as Modaflo™ and Modaflo™III from Monsanto and fluorochemicals such as Fluorad™ FC430 from 3M Company.

The curable composition of the invention can optionally further comprise a filler. Examples of suitable fillers include but are not limited to those selected from the group consisting of wollastonite, calcium carbonate, clays, feldspar and silica.

The curable composition of the invention can optionally further comprise a colorant such as pigments and toners.

Examples of suitable colorants include but are not limited to those selected from the group consisting of rutile and anatase titanium dioxide, iron oxides, chrome oxides, phthalocyanine green and phthalocyanine blue.

The present invention also provides articles coated with the cured or uncured compositions of the invention. For example a metal substrate such as iron or steel may be coated with the compositions of the invention.

EXAMPLES

The following examples further illustrate but do not limit the present invention. All parts, percentages, ratios, etc., in the examples and elsewhere herein are by weight unless indicated otherwise.

Preparation of Catechol Cresol Novolaks (CCN) (Examples 1–7)

Example 1. Preparation of catechol-(p-cresol) novolak

To a 1 liter, 3 necked round bottomed flask equipped with a paddle stirrer, heating mantle and thermometer was added 108 g (1.0 moles) of p-cresol, followed by a solution of 20 g (0.25 moles) of 50% aqueous sodium hydroxide in 150 g of water. The reaction mixture was stirred as 154 g (1.90 moles) of 37% formaldehyde solution were added in one portion. The reaction mixture was heated to 45° C. and held at this temperature for 18 hours. To the reaction flask were added 220 g (2.0 moles) of catechol The temperature dropped to 35° C. as the catechol partially dissolved. To the reaction flask was added 33 g (0.37 moles) of oxalic acid. The reaction mixture slowly increased in temperature to 60° C. and then leveled off. The temperature of the reaction mixture was increased to 65° C., then allowed to slowly exotherm to 80° C. over 20 minutes. The reaction contents were held at 80° C. for 15 minutes. The product began to separate from the water. The reaction mixture was heated to 95° C. and held at this temperature for 3 hours.

Stirring was stopped, and the product layer was allowed to settle to the bottom of the flask. The aqueous layer was decanted and replaced with an equal volume of clean water. The reaction mixture was heated to 90° C., while stirring, for 1 hour. The stirring was stopped to allow two layers to form, as before. The aqueous layer was decanted. This process was repeated for a total of 4 times.

After the final decantation, the reaction product was stirred and heated to remove residual water. The dark, resinous like product was heated to 190° C. at atmospheric pressure and held at this temperature for 10 minutes. The product was poured into an aluminum tray and allowed to cool to room temperature and solidify. The product was broken into small lumps and stored in an air tight container. The total yield of product was 260 g. In a similar reaction at twice this scale, the resin obtained had a Tg of 93.4° C. as determined by differential scanning calorimetry (DSC) and was found by $^{13}$C NMR to contain 3.5% by weight free catechol.

Example 2. Preparation of catechol-(p-isopropylphenol)novolak

To a 2 liter, 3 necked round bottomed flask equipped with a paddle stirrer, thermometer and heating source, were added 250 g (1.83 moles) of 4-isopropylphenol followed by a solution of 73.2 g (1.83 moles) in one liter of water. Stirring was started as 300 g (3.7 moles) of 37% aqueous formaldehyde were added in one portion. The temperature was at 30° C., and was increased to 45° C., and held at this temperature overnight.

The reaction mixture remained clear. The reaction mixture was cooled to 25° C. and then neutralized with glacial acetic acid to precipitate the reaction product. The reaction product was further diluted with water and stirred, then vacuum filtered. The product cake was rinsed several times with water, then transferred to a tray and spread out to dry in a stream of air. A beige solid was recovered. 373 g (95% yield) of crude 2,6-dimethylol-4-isopropylphenol product was isolated.

To a 1 liter, 3 necked round bottomed flask equipped with a paddle stirrer, condenser, thermometer and heating source, were added 160 g (0.81 mole) of the 2,6-dimethylol-4-isopropylphenol, followed by 9 g (0.1 moles) of oxalic acid and 180 g (1.63 moles) of catechol. To this were added 400 g of water. The reaction mixture was stirred and heated to 70° C. Solution occurred when the temperature reached approximately 60° C. Then, the reaction mixture was heated to reflux and held for 4 hours. After 1 hour at reflux, the product began to separate.

Stirring was stopped, and the product layer was allowed to settle to the bottom of the flask. The aqueous layer was decanted and replaced with an equal volume of clean water. The reaction contents were heated to 90° C., while stirring, for 1 hour. The stirring was stopped to allow two layers to form, as before. The aqueous layer was decanted. This process was repeated for a total of 4 times. The product was stirred and heated to 190° C. to remove residual water and held at this temperature for 10 minutes. The product was drained to an aluminum tray and allowed to cool. The yield was approximately 230 g. The product was found to have a Tg of approximately 97° C. as determined by differential scanning calorimetry.

Example 3. Preparation of catechol-(p-ethylphenol) novolak

To a 2 liter, 3 necked round bottomed flask equipped with a paddle stirrer, thermometer and heating source, were added 244.3 g (2 moles) of 4-ethylphenol followed by a solution of 80 g (2 moles) of NaOH in one liter of water. Stirring was started and 330 g (4.02 moles) of 37% aqueous formaldehyde were added in one portion. The temperature was raised to 45° C., and was held at this temperature overnight.

The reaction mixture remained clear. The reaction mixture was cooled to 25° C. and neutralized with glacial acetic acid to precipitate the reaction product. The reaction product was further diluted with water and stirred to uniformity, then vacuum filtered. The product was rinsed several times with water, then transferred to a tray and spread out to dry in a stream of air. A beige-tan solid was recovered. 322 g (88% yield) of crude 2,6-dimethylol-4-ethylphenol product was isolated.

To a 1 liter, 3 necked round bottomed flask equipped with a paddle stirrer, condenser, thermometer and heating source, were added 150 g (0.81 mole) of the 2,6-dimethylol-4-ethylphenol, followed by 9 g (0.1 moles) of oxalic acid and 181 g (1.64 moles) of catechol. To this was added 400 g of water. The reaction mixture was stirred and heated to 70° C. Solution occurred when the temperature reached approximately 60° C. Then, the reaction mixture was heated to reflux and held for 4 hours. After 1 hour at reflux, the product began to separate.

Stirring was stopped, and the product layer was allowed to settle to the bottom of the flask. The aqueous layer was decanted and replaced with an equal volume of clean water. The reaction product was heated to 90° C., while stirring, for 1 hour. The stirring was stopped to allow two layers to form, as before. The aqueous layer was decanted. This process was repeated for a total of 4 times. The reaction product was stirred and heated to 200° C. to remove residual water. The product was drained to an aluminum tray and allowed to cool. The yield was approximately 233 g. The product was found to have a Tg of approximately 94° C. as determined by differential scanning calorimetry.

Example 4. Preparation of catechol-(p-chlorophenol) novolak

To a 2 liter, 3 necked round bottomed flask equipped with a paddle stirrer, thermometer and heating source, were added 257 g (2 moles) of parachlorophenol followed by a solution of 80 g (2 moles) of NaOH in one liter of water. Stirring was started and 330 g (4.02 moles) of 37% aqueous formaldehyde were added in one portion. The temperature was raised to 45° C., and was held at this temperature overnight.

The sodium salt of the product precipitated. The reaction mixture was cooled to 25° C. and neutralized with glacial acetic acid to precipitate the reaction product. The pasty material was further diluted with water and stirred, then vacuum filtered. The solid product cake was rinsed several times with water, then transferred to a tray and spread out to dry in a stream of air. A yellowish-beige solid was recovered. 245 g (65% yield) of crude 4-chloro-2,6-dimethylolphenol product was isolated. The yield was not optimized.

To a 1 liter, 3 necked round bottomed flask equipped with a paddle stirrer, condenser, thermometer and heating source, were added 188.6 g (1 mole) of the 4-chloro-2,6-dimethylolphenol, followed by 10 g (0.11 moles) of oxalic acid and 220 g (2 moles) of catechol. To this were added 400 g of water. The reaction mixture was stirred and heated to 70° C. Solution occurred when the temperature reached approximately 60° C. Then, the reaction mixture was heated to reflux and held at reflux for 4 hours. After 1 hour at reflux, the product began to separate.

Stirring was stopped, and the product layer was allowed to settle to the bottom of the flask. The aqueous layer was decanted and replaced with an equal volume of clean water. The reaction product was heated to 90° C., while stirring, for 1 hour. The stirring was stopped to allow two layers to form, as before. The aqueous layer was decanted. This process was repeated for a total of 4 times. After the final decantation, the reaction product was stirred and heated to 190° C. to remove residual water. The product was drained to an aluminum tray and allowed to cool. The yield was approximately 225 g. The product was found to have a Tg of 94.6° C. as determined by differential scanning calorimetry.

Example 5. Preparation of catechol-(p-methoxyphenol) novolak

To a 2 liter, 3 necked round bottomed flask equipped with a paddle stirrer, thermometer and heating source, were added 248.3 g (2 moles) of 4-methoxyphenol followed by a solution of 80 g (2 moles) of NaOH in one liter of water. Stirring was started and 330 g (4.02 moles) of 37% aqueous formaldehyde were added in one portion. The temperature was raised to 45° C. and held at this temperature overnight.

The sodium salt of the product precipitated. The reaction contents were cooled to 25° C. and neutralized with glacial acetic acid to precipitate the reaction product. The pasty material was further diluted with water and stirred, then vacuum filtered. The solid product cake was rinsed several times with water, then transferred to a tray and spread out to dry in a stream of air. A beige solid was recovered. 327 g (89% yield) of the crude 2,6-dimethylol-4-methoxyphenol product was isolated.

To a 1 liter, 3 necked round bottomed flask equipped with a paddle stirrer, condenser, thermometer and heating source, were added 150 g (0.81 mole) of the 2,6-dimethylol-4-methoxyphenol, followed by 9 g (0.1 moles) of oxalic acid and 180 g (1.63 moles) of catechol. To this were added 400 g of water. The reaction mixture was stirred and heated to 70° C. Solution occurred when the temperature reached approximately 60° C. Then, the reaction mixture was heated to reflux and held at reflux for 4 hours. After 1 hour at reflux, the product began to separate.

Stirring was stopped, and the product layer was allowed to settle to the bottom of the flask. The aqueous layer was decanted and replaced with an equal volume of clean water. The reaction product was heated to 90° C., while sting, for 1 hour. The stirring was stopped to allow two layers to form, as before. The aqueous layer was decanted. This process was repeated for a total of 4 times. After the final decantation, the reaction product was stirred and heated to 200° C. to remove the residual water. The product was drained to an aluminum tray and allowed to cool. The yield was approximately 214 g. The product was found to have a Tg of approximately 111° C. as determined by DSC.

Example 6. Preparation of 4-methylcatechol-(p-cresol) novolak

To a 3 liter, 3 necked round bottomed flask equipped with a paddle stirrer, condenser, thermometer and heating source, were added 542 g (5 moles) of p-cresol followed by 300 mls of water. To this mixture were added 800 g of 25% aqueous NaOH. The solution was stirred and cooled to 40° C. To this was added 832 g (10.25 moles) of 37% formaldehyde. The temperature of the reaction contents increased to 50° C., and was kept from rising further by using an ice-water cooling bath. Within 30 minutes, the product precipitated as the sodium salt. The reaction mixture was allowed to stir at 50° C. for 18 hours. The reaction mixture was cooled to 40° C. and neutralized with glacial acetic acid to precipitate the reaction product. Water was added to the reaction mixture and the product was vacuum filtered. The product cake was further slurried with clean water and vacuum filtered again. The product was placed into an aluminum tray and spread out to dry in a stream of air. The yield of desired 2,6-bis (hydroxymethyl)4-methylphenol was 821 g (97.6%).

To a 1 liter, 3 necked round bottomed flask equipped with a paddle stirrer, condenser, thermometer and heating source, were added 135 g (0.80 mole) of 2,6-bis(hydroxymethyl)-4-methylphenol, followed by 9 g (0.10 moles) of oxalic acid and 200 g (1.61 moles) of 4-methylcatechol. To this mixture were added 400 g of water. The reaction mixture was stirred and heated to 70° C. Solution occurred when the temperature reached approximately 60° C. Then, the reaction mixture was heated to reflux and held at reflux for 4 hours. After 1 hour at reflux, the product began to separate.

Stirring was stopped, and the product layer was allowed to settle to the bottom of the flask. The aqueous layer was decanted and replaced with an equal volume of clean water. The reaction product was heated to 90° C., while stirring, for 1 hour. The stirring was stopped to allow two layers to form, as before. The aqueous layer was decanted. This process was repeated for a total of four times. After the final decantation, the reaction product was stirred and heated to 190° C., to remove residual water. The product was drained to an aluminum tray and allowed to cool. The yield was approximately 268 g. The product was found to have a Tg of 75° C. as determined by DSC.

Example 7. Preparation of catechol-(p-cresol) novolak

To a 3 liter, 3 necked round bottomed flask equipped with a paddle stirrer, condenser, thermometer and heating source, were added 542 g (5 moles) of p-cresol followed by 300 ml of water. To this heterogeneous mixture were added 800 g of 25% aqueous NaOH. The solution was stirred and cooled to 40° C. To this mixture were added 832 g (10.25 moles) of 37% formaldehyde. The temperature of the reaction mixture increased to 50° C., and was kept from rising further by using an ice-water cooling bath. Within 30 minutes, the product precipitated as the sodium salt. The reaction mixture was allowed to stir at 50° C. for 18 hours. The reaction mixture was cooled to 40° C. and neutralized with glacial acetic acid to precipitate the reaction product. Water was added to the reaction product and the product was vacuum filtered. The product cake was further slurried with clean water and vacuum filtered again. It was placed into an aluminum tray and spread out to dry in a stream of air. The yield of desired crude 2,6-bis(hydroxymethyl)-4-methylphenol product was 821 g (97.6%).

To a 1 liter, 3 necked round bottomed flask equipped with a paddle stirrer, condenser, thermometer and heating source, were added 159 g (1.45 moles) of catechol, 10 g (0.11 moles) of oxalic acid and 100 g of water. The mixture was stirred and heated to 60° C. Complete solution was obtained. 147 g (0.874 moles) of 2,6-bis(hydroxymethyl)-4-methylphenol were added, in eight equal portions. After the first portion was added, the temperature dropped several degrees. The temperature of the reaction mixture was raised to 70° C. and four more portions were added at 15 minute intervals. After five portions were added, the temperature of the reaction was raised to 80° C. and the remaining three portions were added at 15 minute intervals. The reaction product phase separated, with the water layer on top. The temperature was then raised to 110° C. and held for 10 minutes. The temperature was then raised to 185° C. and held for 15 minutes. Vacuum was gradually applied and ultimately brought to 30 mm Hg. The reaction mixture was held under these conditions for 30 minutes. The vacuum was broken and the hot product drained into an aluminum dish. After cooling, a dark brown, brittle solid was obtained. $^{13}C$ NMR shows an average molecular weight of 994 and approximately 5.3%, by weight, of free catechol. Differential scanning calorimetry shows a Tg of 97° C.

Preparation of Fusion Bondable Epoxy Powder Coating Formulations containing Catechol Cresol Novolaks. (Examples 8–13)

The materials in the amounts indicated in Table 1 were weighed together in a one gallon can and ground to a coarse powder. The dry mixture was sealed in the can and mixed on a paint shaker for 15 minutes. The dry mixture was then fed into a co-rotating twin screw extruder having a 15 mm bore and a length to diameter ratio of 15:1 available from APV Corporation. Prior the this extrusion, the extruder was purged with Epon™ 2004. The feed rate of the extruder was set at 0.91 kg/hour and had an output temperature of 105°–110° C. The extrudate was collected off of a quench roll, air cooled and milled using a hammer mill or other similar milling apparatus. The milled powder was sieved through a No. 70 mesh sieve and a powder having a nominal average particle size of about 40–50 microns was obtained. Cab-O-Sil™ M5 (Cabot Corp.) was then incorporated (0.35% by weight of the powder formulation) as a fluidizing agent and the finished powder was placed in a glass container and tightly sealed.

TABLE 1

Fusion Bondable Epoxy Powder Coating Formulations

| Component | PHR[14] | Ex. 8 (g) | Ex. 9 (g) | Ex. 10 (g) | Ex. 11 (g) | Ex. 12 (g) | Ex. 13 (g) |
|---|---|---|---|---|---|---|---|
| Epon ™ 2004[1] solid epoxy resin | 100.00 | 400.0 | 400.0 | 400.0 | 400.0 | 400.0 | 400.0 |
| catechol-(p-cresol) novolak[2] | 1.00 | 4.0 | — | — | — | — | — |
| catechol-(p-isopropylphenol) novolak[3] | 1.00 | — | 4.0 | — | — | — | — |
| catechol-(p-ethylphenol) novolak[4] | 1.00 | — | — | 4.0 | — | — | — |
| catechol-(p-chlorophenol) novolak[5] | 1.00 | — | — | — | 4.0 | — | — |
| catechol-(p-methoxyphenol) novolak[6] | 1.00 | — | — | — | — | 4.0 | — |
| 4-methylcatechol-(p-cresol) novolak[7] | 1.00 | — | — | — | — | — | 4.0 |
| Dicyandiamide (5 micron)[8] curing agent | 1.75 | 7.0 | 7.0 | 7.0 | 7.0 | 7.0 | 7.0 |
| Epicure ™ P101[9] 2-methylimidazole encapped epoxy catalyst | 1.40 | 5.6 | 5.6 | 5.6 | 5.6 | 5.6 | 5.6 |
| Vansil ™ W-20[10] wollastonite filler | 44.35 | 177.4 | 177.4 | 177.4 | 177.4 | 177.4 | 177.4 |
| Unitane ™ O-110[11] TiO$_2$ pigment | 1.75 | 7.0 | 7.0 | 7.0 | 7.0 | 7.0 | 7.0 |
| Phthalocyanine Green Toner[12] | 0.08 | 0.32 | 0.32 | 0.32 | 0.32 | 0.32 | 0.32 |
| Modaflow ™ III[13] polyacrylate flow control agent | 1.00 | 4.0 | 4.0 | 4.0 | 4.0 | 4.0 | 4.0 |

[1]available from Shell Chemical Co.
[2]from Example 1
[3]from Example 2
[4]from Example 3
[5]from Example 4
[6]from Example 5
[7]from Example 6
[8]available from Pacific Anchor Chemical Co.
[9]available from Shell Chemical Co.
[10]available from R. T. Vanderbilt
[11]available from Kemira Inc.
[12]available from Sun Chemical Co
[13]available from Monsanto Chemical Co.
[14]PHR = parts per hundred resin Comparative Example 1. Preparation of a Fusion Bondable Powder Coating Formulation without any Novolak The procedure for Example 8, outlined above, was followed however the catechol cresol novolak was deleted.

Comparative Example 2. Preparation of a Fusion Bondable Powder Coating Formulation containing a Phenolic Novolak The procedure for Example 8, outlined above, was followed however 4.0 g of Durite™ SD1711 phenolic novolak from Borden Chemical Co. was substituted for the catechol cresol novolak.

Preparation of Fusion Bondable Powder Coatings and Cathodic Disbondment Tests Cathodic disbandment tests are routinely used as a reliable indicator of polymer to metal substrate interfacial bond durability.

Powder coatings were prepared from the powder coating formulations of Examples 8 to 13 and from Comparative Examples 1 and 2.

The coatings were prepared by first dessicating the powders in a vacuum chamber evacuated to 5 mm of Hg for 24 hours. The powder to be coated was then placed in a fluidized bed and hot rolled steel panels (88.9 mm (3.5 in)×88.9 mm (3.5 in)×6.4 mm (0.25 in)) which were induction heated to about 220° C. were introduced into the fluidized bed and coated by the powder to a coating thickness of approximately 0.48 mm (19 mils). Two panels were prepared with each coating formulation. The panels were post cured after coating for 2 minutes in a 204° C. oven.

After cooling, each panel was constructed into a cathodic disbondment test cell and the cathodic disbondment resistance of the coated and cured powder coatings was measured in accordance with ASTM A934/A934M annex, Test Method A1.2.2.1 Test A with reference to ASTM G95-87. The noted procedural modifications included the size of the test panels (88.9×88.9×6.4 mm hot rolled steel), the number of test panels (2) and the container cylinder size (76.2 mm diameter×254 mm height). The test measured the coating disbondment radius (in mm) from an induced coating defect after 14 days in a cathodic chamber at 79° C. The results of this test are shown in Table 2 below.

TABLE 2

Radius of Coating Disbondment

| Example | Panel 1 (mm) | Panel 2 (mm) | Average (mm) |
| --- | --- | --- | --- |
| 8 | 4.0 | 4.1 | 4.0 |
| 9 | 4.2 | 5.2 | 4.7 |
| 10 | 4.0 | 4.0 | 4.0 |
| 11 | 3.6 | 3.8 | 3.7 |
| 12 | 6.1 | 7.5 | 6.8 |
| 13 | 3.1 | 4.0 | 3.6 |
| Comparative 1 | 7.1 | 8.8 | 8.0 |
| Comparative 2 | 7.4 | 7.2 | 7.3 |

Various modifications and alterations of this invention will become apparent to those skilled in the art without departing from the scope and spirit of this invention, and it should be understood that this invention is not to be unduly limited to illustrative embodiments set forth herein.

It is claimed:

1. A curable composition comprising:

(a) an epoxy resin;

(b) a compound comprising a polymer of the formula:

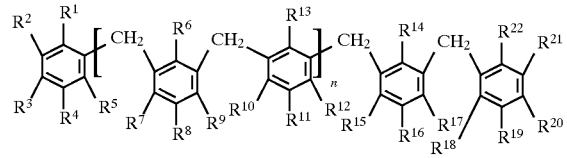

wherein:

$R^1$, $R^2$, $R^3$, $R^4$, and $R^5$ are each independently selected from the group consisting of —OH, —SH, —H, $C_{1-20}$alkyl, —F, —Cl, —Br, —I, alkoxy, aryl, alkaryl, and alkenyl groups;

$R^1$, $R^2$, $R^3$, $R^4$, and $R^5$ are selected such that at least two vicinal groups selected from the group consisting of —OH, —SH, and combinations thereof are present on a ring structure to which $R^1$, $R^2$, $R^3$, $R^4$, and $R^5$ are attached;

one of the groups selected from the group consisting of $R^6$, $R^7$, and $R^9$ are —OH or —SH and the remainder of the groups selected from the group consisting of $R^6$, $R^7$, and $R^9$ are selected independently from the group consisting of —H, $C_{1-20}$alkyl, —F, —Cl, —Br, —I, alkoxy, aryl, alkaryl, and alkenyl groups;

$R^8$ is selected from the group consisting of $C_{1-20}$alkyl, —H, —F, —Cl, —Br, —I, alkoxy, aryl, alkaryl, and alkenyl groups;

$R^{11}$ is selected from the group consisting of —OH and —SH, $R^{10}$ and $R^{12}$ are each independently selected from the group consisting of —OH, —SH, —H, $C_{1-20}$alkyl, —F, —Cl, —Br, —I, alkoxy, aryl, alkaryl, and alkenyl groups; wherein at least one of $R^{10}$ and $R^{12}$ is —OH or —SH;

$R^{13}$ is selected from the group consisting of —H, $C_{1-20}$alkyl, —OH, —SH, —F, —Cl, —Br, —I, alkoxyl, aryl, alkaryl, and alkenyl groups;

one of the groups selected from $R^{14}$, $R^{15}$, and $R^{17}$ are —OH or —SH and the remainder of the groups selected from the group consisting of $R^{14}$, $R^{15}$, and $R^{17}$ are independently selected from the group consisting of —H, $C_{1-20}$alkyl, —F, —Cl, —Br, —I, alkoxy, aryl, alkaryl, and alkenyl groups;

$R^{16}$ is selected from the group consisting of $C_{1-20}$alkyl, —H, —F, —Cl, —Br, —I, alkoxy, aryl, alkaryl, and alkenyl groups;

$R^{18}$, $R^{19}$, $R^{20}$, $R^{21}$, and $R^{22}$ are each independently selected from the group consisting of —OH, —SH, —H, $C_{1-20}$alkyl, —F, —Cl, —Br, —I, alkoxy, aryl, alkaryl, and alkenyl groups;

$R^{18}$, $R^{19}$, $R^{20}$, $R^{21}$, and $R^{22}$ are selected such that at least two vicinal groups selected from the group consisting of —OH, —SH, and combinations thereof are present on a ring structure to which $R^{18}$, $R^{19}$, $R^{20}$, $R^{21}$, and $R^{22}$ are attached; and n is an integer of zero or greater;

(c) a catalyst;

(d) optionally a hygroscopic solvent; and (e) optionally a curing agent different than that of element (b).

2. The cured composition of claim 1.

3. A process of promoting adhesion properties of an epoxy resin, the process comprising the step of adding a compound of the formula:

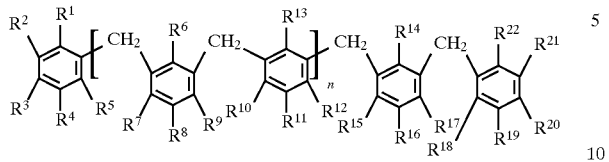

wherein:
- $R^1$, $R^2$, $R^3$, $R^4$, and $R^5$ are each independently selected from the group consisting of OH, SH, H, $C_{1-20}$alkyl, F, Cl, Br, I, alkoxy, aryl, alkaryl, and alkenyl groups;
- $R^1$, $R^2$, $R^3$, $R^4$, and $R^5$ are selected such that at least two vicinal groups selected from the group consisting of OH, SH, and combinations thereof are present on a ring structure to which $R^1$, $R^2$, $R^3$, $R^4$, and $R^5$ are attached;
- one of the groups selected from the group consisting of $R^6$, $R^7$, and $R^9$ are OH or SH and the remainder of the groups selected from the group consisting of $R^6$, $R^7$, and $R^9$ are selected independently from the group consisting of H, $C_{1-20}$alkyl, F, Cl, Br, I, alkoxy, aryl, alkaryl, and alkenyl groups;
- $R^8$ is selected from the group consisting of $C_{1-20}$alkyl, H, F, Cl, Br, I, alkoxy, aryl, alkaryl, and alkenyl groups;
- $R^{11}$ is selected from the group consisting of OH and SH;
- $R^{10}$ and $R^{12}$ are each independently selected from the group consisting of OH, SH, H, $C_{1-20}$alkyl, F, Cl, Br, I, alkoxy, aryl,,alkaryl, and alkenyl groups; wherein at least one of $R^{10}$ and $R^{12}$ is OH or SH;
- $R^{13}$ is selected from the group consisting of H, $C_{1-20}$alkyl, OH, SH, F, Cl, Br, I, alkoxyl, aryl, alkaryl, and alkenyl groups;
- one of the groups selected from $R^{14}$, $R^{15}$, and $R^{17}$ are OH or SH and the remainder of the groups selected from the group consisting of $R^{14}$, $R^{15}$, and $R^{17}$ are independently selected from the group consisting of $C_{1-20}$alkyl, F, Cl, Br, I, alkoxy, aryl, alkaryl, and alkenyl groups;
- $R^{16}$ is selected from the group consisting of $C_{1-20}$alkyl, H, F, Cl, Br, I, alkoxy, aryl, alkaryl, and alkenyl groups;
- $R^{18}$, $R^{19}$, $R^{20}$, $R^{21}$, and $R^{22}$ are each independently selected from the group consisting of OH, SH, H, $C_{1-20}$alkyl, F, Cl, Br, I, alkoxy, aryl, alkaryl, and alkenyl groups;
- $R^{18}$, $R^{19}$, $R^{20}$, $R^{21}$, and $R^{22}$ are selected such that at least two vicinal groups selected from the group consisting of OH, SH, and combinations thereof are present on a ring structure to which $R^{18}$, $R^{19}$, $R^{20}$, $R^{21}$, and $R^{22}$ are attached; and
- n is an integer of zero or greater.

4. The process of claim 3 wherein
- $R^2$, $R^3$, $R^{20}$, and $R^{21}$ are each independently selected from the group consisting of —OH and —SH;
- $R^1$, $R^4$, $R^5$, $R^{18}$, $R^{19}$, and $R^{22}$ are each independently selected from the group consisting of —H and $C_{1-20}$alkyl groups;
- $R^6$ and $R^{14}$ are each independently selected from the group consisting of —OH and —SH;
- $R^8$ and $R^{16}$ are each independently selected from the group consisting of $C_{1-20}$alkyl, —H, —F, —Cl, —Br, and —I;
- $R^7$, $R^9$, $R^{15}$, and $R^{17}$ each represent —H;
- $R^{11}$ is selected from the group consisting of —H and —SH;
- $R^{10}$ and $R^{12}$ are independently selected from the group consisting of —OH, —SH, —H, $C_{1-20}$alkyl, —F, —Cl, —Br, —I, alkoxy, aryl, alkaryl, and alkenyl groups; wherein at least one of $R^{10}$ and $R^{12}$ is —OH or —SH; and
- $R^{13}$ is selected from the group consisting of $C_{1-20}$alkyl, —H, —F, —Cl, —Br, —I, alkoxy, aryl, alkaryl, and alkenyl groups.

5. The process of claim 3 wherein
- $R^2$, $R^3$, $R^6$, $R^{10}$, $R^{11}$, $R^{14}$, $R^{19}$, and $R^{20}$ each represent —OH;
- $R^1$, $R^4$, $R^5$, $R^7$, $R^9$, $R^{12}$, $R^{13}$, $R^{15}$, $R^{17}$, $R^{18}$, $R^{21}$, and $R^{22}$ each represent —H; and
- $R^8$ and $R^{16}$ each represent —$CH_3$.

6. The process of claim 3 wherein n is an integer of 0 to 10.

7. The process of claim 3 wherein n is an integer of 0 to 2.

* * * * *

UNITED STATES PATENT AND TRADEMARK OFFICE
CERTIFICATE OF CORRECTION

PATENT NO. : 5,859,153
DATED : June 21, 1996
INVENTOR(S) : Alan R. Kirk and Allen L. Griggs Page 1 of 1

It is certified that error appears in the above-identified patent and that said Letters Patent is hereby corrected as shown below:

<u>Column 4,</u>
Line 21, "—H," (1st instance), should read -- —OH, --.

Signed and Sealed this

Tenth Day of July, 2001

Attest:

NICHOLAS P. GODICI
Attesting Officer   Acting Director of the United States Patent and Trademark Office